(12) United States Patent
Lin et al.

(10) Patent No.: US 9,164,274 B2
(45) Date of Patent: Oct. 20, 2015

(54) WAVELENGTH CONVERSION WHEEL MODULE AND ILLUMINATION SYSTEM

(71) Applicants: Yin-Cheng Lin, Hsin-Chu (TW); Chi-Hsun Wang, Hsin-Chu (TW); Ko-Shun Chen, Hsin-Chu (TW)

(72) Inventors: Yin-Cheng Lin, Hsin-Chu (TW); Chi-Hsun Wang, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 153 days.

(21) Appl. No.: 13/950,273

(22) Filed: Jul. 24, 2013

(65) Prior Publication Data

US 2014/0118991 A1    May 1, 2014

(30) Foreign Application Priority Data

Oct. 29, 2012 (CN) .......................... 2012 1 0421189

(51) Int. Cl.
| | |
|---|---|
| *G02B 26/00* | (2006.01) |
| *H04N 9/31* | (2006.01) |
| *G03B 21/20* | (2006.01) |
| *G03B 33/08* | (2006.01) |
| *F21V 9/10* | (2006.01) |
| *F21S 10/02* | (2006.01) |

(52) U.S. Cl.
CPC ............ *G02B 26/008* (2013.01); *G03B 21/204* (2013.01); *G03B 33/08* (2013.01); *H04N 9/3114* (2013.01); *H04N 9/3158* (2013.01); *F21S 10/02* (2013.01); *F21V 9/10* (2013.01)

(58) Field of Classification Search
CPC .... F21W 2131/406; F21V 9/10; F21V 17/02; F21V 9/16; F21S 10/02; F21K 9/20; G03B 33/08; G03B 21/204

USPC .............................. 362/293, 281, 84; 359/634
See application file for complete search history.

(56) References Cited

U.S. PATENT DOCUMENTS 1,820,899 A * 8/1931 Greenewalt ................... 362/231
5,580,164 A * 12/1996 Maddox et al. ............... 362/293
(Continued)

FOREIGN PATENT DOCUMENTS

| | | |
|---|---|---|
| CN | 1750146 | 3/2006 |
| JP | 2004087085 | 3/2004 |
| KR | 20030048562 | 6/2003 |

OTHER PUBLICATIONS

"Office Action of China Counterpart Application", issued on Jul. 13, 2015, p1-p6, in which the listed references were cited.

*Primary Examiner* — Anabel Ton
(74) *Attorney, Agent, or Firm* — Jianq Chyun IP Office (57) ABSTRACT

A wavelength conversion wheel module and an illumination system are provided. The wavelength conversion wheel module includes a wavelength conversion wheel and a first actuator. The wavelength conversion wheel includes a plurality of annular areas. Each of the annular areas includes at least one wavelength conversion area and at least one light passing area. The wavelength conversion area converts an original light beam incident on the wavelength conversion area into a converted light beam. The wavelength of the converted light beam is different from the wavelength of the original light beam. The annular areas are arranged along the radial direction of the wavelength conversion wheel, and different annular areas have different optical parameters. The optical parameters of the annular areas are related to the wavelength conversion area and the light passing area. The first actuator is connected to the wavelength conversion wheel, and drives the wavelength conversion wheel to rotate.

19 Claims, 5 Drawing Sheets

(56) References Cited

U.S. PATENT DOCUMENTS

| | | | |
|---|---|---|---|
| 6,048,080 A * | 4/2000 | Belliveau | 362/282 |
| 6,813,087 B2 | 11/2004 | Davis | |
| 7,052,146 B2 | 5/2006 | Esterberg et al. | |
| 7,147,350 B1 * | 12/2006 | Schofield | 362/324 |
| 7,461,950 B2 | 12/2008 | Yamanaka | |
| 7,651,243 B2 * | 1/2010 | McGuire et al. | 362/293 |
| 8,061,874 B2 * | 11/2011 | Bornhorst | 362/293 |
| 2004/0119947 A1 | 6/2004 | Kim et al. | |
| 2007/0019408 A1 | 1/2007 | McGuire et al. | |
| 2011/0116253 A1 | 5/2011 | Sugiyama | |
| 2012/0039065 A1 | 2/2012 | Sun et al. | |
| 2012/0307388 A1 * | 12/2012 | Bornhorst | 359/888 |

* cited by examiner

WAVELENGTH CONVERSION WHEEL MODULE AND ILLUMINATION SYSTEM

CROSS-REFERENCE TO RELATED APPLICATION

This application claims the priority benefit of China application serial no. 201210421189.2, filed on Oct. 29, 2012. The entirety of the above-mentioned patent application is hereby incorporated by reference herein and made a part of this specification.

BACKGROUND OF THE INVENTION

1. Field of the Invention

The invention generally relates to an optical module and an optical system, and more particularly, to a wavelength conversion wheel module and an illumination system.

2. Description of Related Art

In recent years, projection devices with solid state light sources, such as light-emitting diodes (LED) and laser diodes, have gradually gained their market share. LEDs have a luminous efficiency between 5% and 8% and come with different luminous spectra, such as a red spectrum, a green spectrum, and a blue spectrum. LEDs offer excellent luminous spectra (i.e., luminous spectra with high spectral peak values and small spectral widths), and are used as the pure color light sources in projectors.

On the other hand, laser diodes have a luminous efficiency over 20%. To break the limit of LED light source, a technique of exciting phosphor with a laser light source to generate the pure color light source desired by a projection device has been developed. The two techniques mentioned above are the mainstream of today's solid state light source for projection devices.

In order to achieve a high enough output brightness in a laser projection device, multiple laser arrays are adopted and focused on a phosphor layer to generate an intensive fluorescent light output. This array formed by arranging laser diodes offers a very high light output power for exciting phosphor, and has advantage of flexibility in adjusting the number of light sources such that the needs of different projection brightness would be satisfied. Thereby, projection devices with such light source are highly potential and will replace the conventional projection devices with ultra high pressure (UHP) lamps as their light sources of the mainstream projection devices.

An image projecting system including an illuminating device, an illumination optical system, a spatial modulation element, and a projection optical system is disclosed in U.S. Pat. No. 7,461,950. An illumination system adapted to a projector is disclosed in U.S. Publication No. 2012/0039065, where the illumination system includes a blue laser light source, a phosphor wheel, and a spectroscope disposed between the blue laser light source and the phosphor wheel. A micro-lens projection system including a light source, an integral rod, a multi-mode color wheel, a spatial light modulator, a total internal reflection prism, and a projection lens is disclosed in U.S. Pat. No. 6,813,087. A transmissive semiconductor light source device adapted to a projector is disclosed in U.S. Publication No. 2011/0116253, where the transmissive semiconductor light source device includes a semiconductor light source that emits an ultraviolet light beam along an optical axis, a phosphor wheel perpendicular to the optical axis, a motor for rotating the phosphor wheel around a shaft, and an actuation module. A color wheel device which can be conveniently dissembled and replaced is disclosed in U.S. Pat. No. 7,052,146.

SUMMARY OF THE INVENTION

The invention is directed to a wavelength conversion wheel module with different wavelength conversion modes.

The invention is directed to an illumination system capable of producing different illumination effects.

Additional aspects and/or advantages of the invention will be set forth in part in the description which follows and, in part, will be obvious from the description, or may be learned by practice of the invention.

An embodiment of the invention provides a wavelength conversion wheel module including a wavelength conversion wheel and a first actuator. The wavelength conversion wheel includes a plurality of annular areas. Each of the annular areas includes at least one wavelength conversion area and at least one light passing area. The at least one wavelength conversion area converts an original light beam incident on the wavelength conversion area into at least one converted light beam, wherein the wavelength of the converted light beam is different from the wavelength of the original light beam. The annular areas are arranged along the radial direction of the wavelength conversion wheel, and different annular areas have different optical parameters, and the optical parameters of the annular areas are related to the wavelength conversion area and the light passing area. The first actuator is connected to the wavelength conversion wheel. The first actuator drives the wavelength conversion wheel to rotate around a rotation center.

An embodiment of the invention provides an illumination system including a light source, a wavelength conversion wheel, and a color wheel. The light source emits an original light beam. The wavelength conversion wheel is disposed on the transmission path of the original light beam and includes a plurality of first annular areas. Each of the first annular areas includes at least one wavelength conversion area. The at least one wavelength conversion area converts the original light beam incident on the wavelength conversion area into at least one converted light beam, where the wavelength of the converted light beam is different from the wavelength of the original light beam. The first annular areas are arranged along the radial direction of the wavelength conversion wheel, and different first annular areas have different optical parameters. Besides, the optical parameters of the first annular areas are related to the wavelength conversion area. When the wavelength conversion wheel rotates around a rotation center in a same wavelength conversion mode, different parts of one of the first annular areas cut into the transmission path of the original light beam by turns. When the wavelength conversion wheel switches among different wavelength conversion modes, the different first annular areas correspondingly cut into the transmission path of the original light beam along the radial direction of the wavelength conversion wheel in a relative movement manner. The color wheel is disposed on the transmission path of the converted light beam and includes a plurality of second annular areas. Each of the second annular areas includes a plurality of light filtering areas with different colors, and the second annular areas are arranged along the radial direction of the color wheel. Different second annular areas have different optical parameters, and the optical parameters of the second annular areas are related to the light filtering areas. When the color wheel rotates around a rotation center in a same light filtering mode, the light filtering areas of one of the second annular areas cut into the transmission path of the converted light beam by turns. When the color wheel switches among different light filtering modes, the different second annular areas correspondingly cut into the transmission path of the converted light beam along the radial direction of the color wheel in the relative movement manner.

An embodiment of the invention provides an illumination system including a light source and a wavelength conversion wheel. The light source emits an original light beam. The wavelength conversion wheel is disposed on the transmission path of the original light beam and includes at least one wavelength conversion area and at least one light passing area. At least one of an optical parameter of the wavelength conversion area and an optical parameter of the light passing area presents a continuous variation along the radial direction of the wavelength conversion wheel. The wavelength conversion area converts the original light beam incident on the wavelength conversion area into a converted light beam. The wavelength of the converted light beam is different from the wavelength of the original light beam. The light passing area allows the original light beam to pass through the wavelength conversion wheel. When the wavelength conversion wheel rotates around a rotation center in a same wavelength conversion mode, different parts of the wavelength conversion wheel at a same radial position cut into the transmission path of the original light beam by turns. When the wavelength conversion wheel switches among different wavelength conversion modes, parts of the wavelength conversion wheel at different radial positions correspondingly cut into the transmission path of the original light beam along the radial direction of the wavelength conversion wheel in a relative movement manner.

An embodiment of the invention may achieve at least one of following advantages or effects. In a wavelength conversion wheel module provided by an embodiment of the invention, a plurality of annular areas having different optical parameters is adopted such that different optical effects may be achieved. In an illumination system provided by an embodiment of the invention, a plurality of annular areas having different optical parameters is adopted in a wavelength conversion wheel and a color wheel such that different illumination effects may be achieved when the annular areas cut into the transmission paths of an original light beam and a converted light beam in a relative movement manner. In an illumination system provided by an embodiment of the invention, at least one of the optical parameter of a wavelength conversion area and the optical parameter of a light passing area presents a continuous variation along the radial direction of the wavelength conversion wheel, so that when the wavelength conversion wheel at different radial positions cuts into the transmission path of an original light beam in a relative movement manner, the illumination system may produce different illumination effects and these illumination effects may also change continuously.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
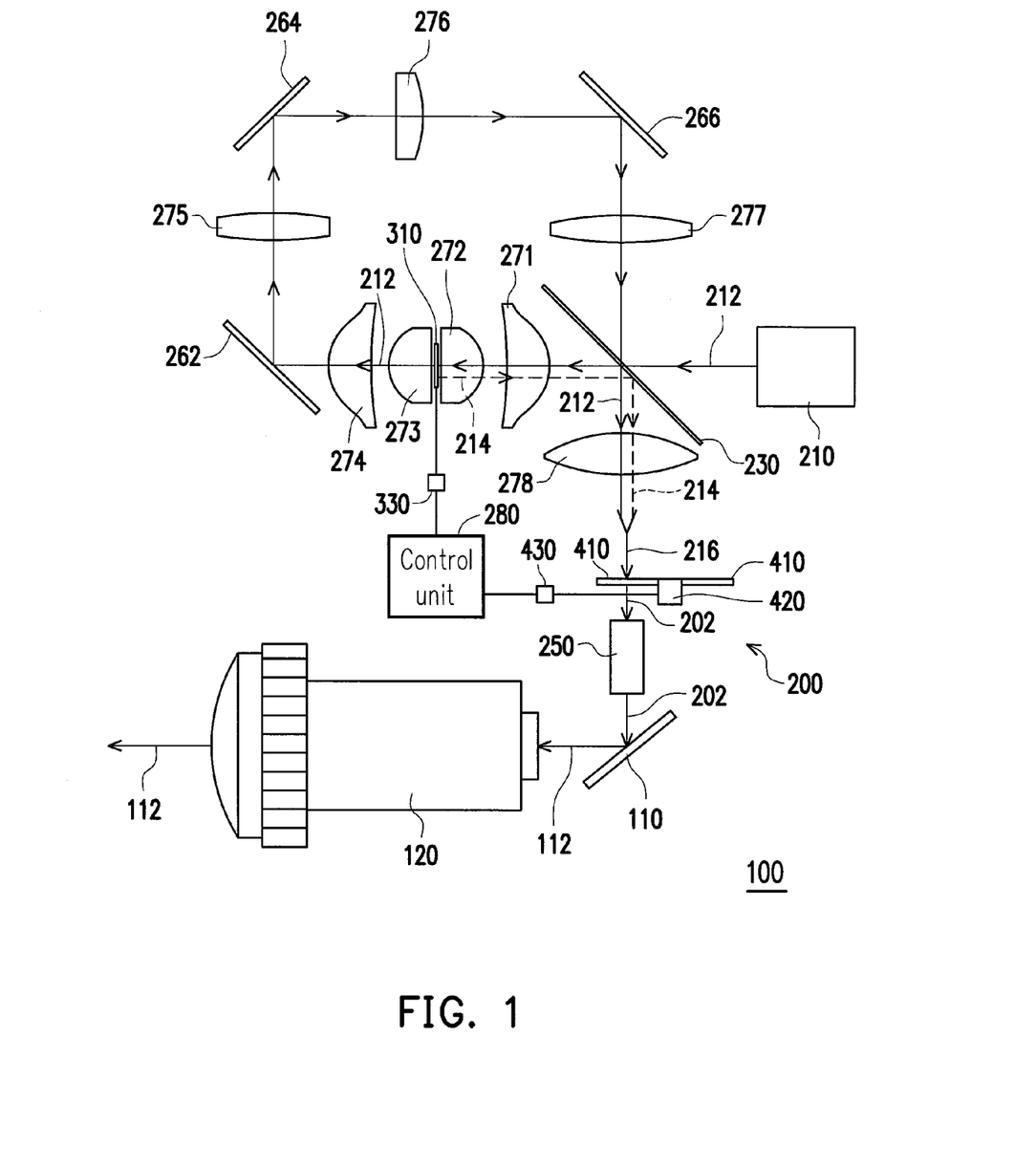
FIG. 1 is a diagram of a projection device according to an embodiment of the invention.
Figure 2A:
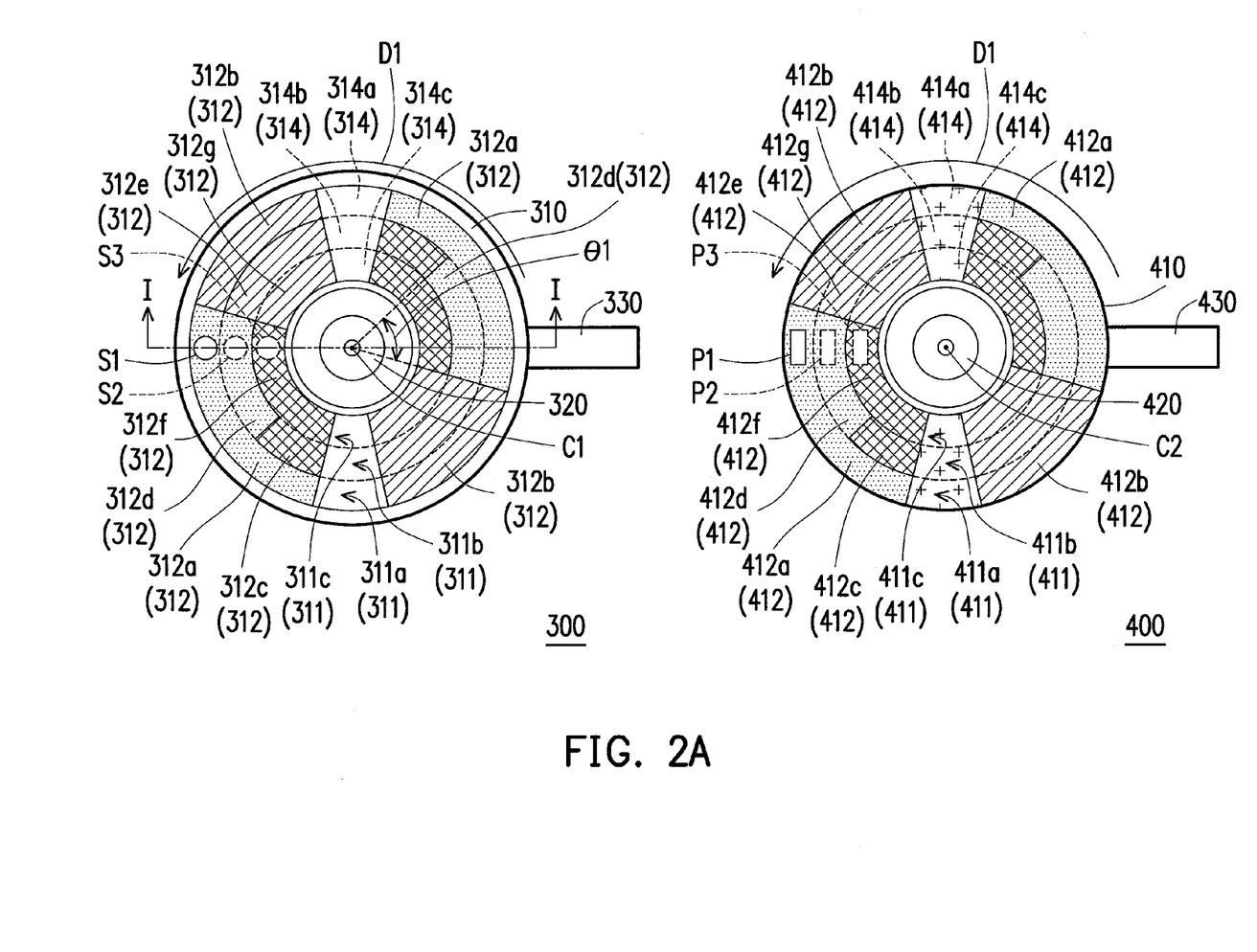
FIG. 2A is a front view of a wavelength conversion wheel module facing an original light beam and a front view of a color wheel module facing an illuminating light beam in an illumination system in FIG. 1.
Figure 2B:
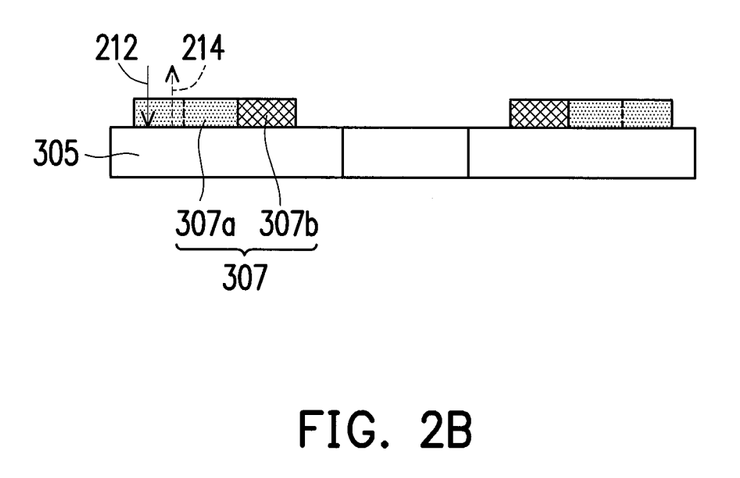
FIG. 2B is a cross-sectional view of a wavelength conversion wheel in FIG. 2A along line I-I.

Referring to FIG. 1, FIG. 2A, and FIG. 2B, the projection device 100 in the embodiment includes an illumination system 200, a light valve 110, and a projection lens 120. The illumination system 200 includes a light source 210, a wavelength conversion wheel module 300, and a color wheel module 400. The light source 210 emits an original light beam 212. In the embodiment, the light source 210 is a coherent light source, and the original light beam 212 is a coherent light beam. The light source 210 may be a laser generator (for example, a laser diode), and the original light beam 212 may be a laser light beam (for example, a blue light beam).

The wavelength conversion wheel module 300 includes a wavelength conversion wheel 310. The wavelength conversion wheel 310 is disposed on the transmission path of the original light beam 212 and includes a plurality of first annular areas 311. As shown in FIG. 2A, in the embodiment, the first annular areas 311 are respectively a first annular area 311a, a first annular area 311b, and a first annular area 311c respectively located at the outer circle, middle circle, and inner circle of the wavelength conversion wheel 310. Each of the first annular areas 311 includes at least one wavelength conversion area 312. In FIG. 2A, a plurality of wavelength conversion areas 312 are illustrated for example, and the wavelength conversion areas 312 convert the original light beam 212 incident on the wavelength conversion areas 312 into a converted light beam 214. The wavelength of the converted light beam 214 is different from the wavelength of the original light beam 212.

For example, the first annular area 311a includes at least one wavelength conversion area 312a (a plurality of wavelength conversion areas 312a are illustrated for example in FIG. 2A) and at least one wavelength conversion area 312b (a plurality of wavelength conversion areas 312b are illustrated for example in FIG. 2A). The first annular area 311b includes at least one wavelength conversion area 312c (a plurality of wavelength conversion areas 312c are illustrated for example in FIG. 2A), at least one wavelength conversion area 312d (a plurality of wavelength conversion areas 312d are illustrated for example in FIG. 2A), and at least one wavelength conversion area 312e (a plurality of wavelength conversion areas 312e are illustrated for example in FIG. 2A). The first annular area 311c includes at least one wavelength conversion area 312f (a plurality of wavelength conversion areas 312f are illustrated for example in FIG. 2A) and at least one wavelength conversion area 312g (a plurality of wavelength conversion areas 312g are illustrated for example in FIG. 2A).

The first annular areas 311 are arranged along the radial direction of the wavelength conversion wheel 310. For example, the first annular areas 311a, 311b, and 311c are sequentially arranged from the outer circle to the inner circle of the wavelength conversion wheel 310. The different first annular areas 311 have different optical parameters, and the optical parameters of the first annular areas 311 are related to the wavelength conversion areas 312.

In the embodiment, the wavelength conversion areas 312 of each first annular area 311 are a plurality of different wavelength conversion areas 312 to respectively convert the original light beam 212 into a plurality of converted light beams 214 having different wavelengths and cut into the transmission path of the original light beam 212 by turns. To be specific, the different wavelength conversion areas 312 may be a plurality of fluorescent areas with different colors respectively, and the original light beam 212 is an excitation light beam. The excitation light beam respectively excites the fluorescent areas to generate the converted light beams 214 with different colors and different wavelengths. To be specific, the wavelength conversion areas 312a and 312d may be yellow fluorescent areas, the wavelength conversion areas 312b, 312e, and 312g may be green fluorescent areas, and the wavelength conversion areas 312c and 312f may be red fluorescent areas. The yellow fluorescent areas convert the original light beam 212 into yellow converted light beams 214, the green fluorescent areas convert the original light beam 212 into green converted light beams 214, and the red fluorescent areas convert the original light beam 212 into red converted light beams 214.

In the embodiment, the wavelength conversion wheel 310 includes a reflective substrate 305 and a plurality of phosphor layers 307 coated over the reflective substrate 305. For example, the phosphor layer 307a may be a yellow phosphor layer to form the wavelength conversion areas 312a and 312d (i.e., the yellow fluorescent areas), and the phosphor layer 307b may be a red phosphor layer to form the wavelength conversion areas 312c and 312f (i.e., the red fluorescent areas). After the wavelength conversion areas 312 convert the original light beam 212 into the converted light beams 214, the reflective substrate 305 reflects the converted light beams 214 in a direction approximately opposite to the transmission direction of the original light beam 212, and the original light beam 212 passing through the wavelength conversion areas 312 but not converted is also reflected back to the wavelength conversion areas 312 again by the reflective substrate 305 in order to increase the ratio of the converted light beams 214 to the original light beam 212.

In the embodiment, the optical parameters of the first annular areas 311 include at least one of the opening angles of the wavelength conversion areas 312 with respect to the rotation center C1 of the wavelength conversion wheel 310 (for example, the opening angle θ1 of the wavelength conversion area 312d with respect to the rotation center C1, as shown in FIG. 2A), the fluorescent materials of the wavelength conversion areas 312, the thicknesses of the fluorescent materials of the wavelength conversion areas 312 (i.e., the thicknesses of the phosphor layers 307), the concentrations of the fluorescent materials of the fluorescent areas (i.e., the concentrations of the fluorescent materials in the phosphor layers 307), the colors of the fluorescent areas, the arrangement order of the fluorescent areas (i.e., the wavelength conversion areas 312) in the same first annular area 311.

In the embodiment, the wavelength conversion wheel module 300 further includes a first actuator 320. The first actuator 320 is connected to the wavelength conversion wheel 310 and drives the wavelength conversion wheel 310 to rotate around the rotation center C1. The first actuator 320 may be a motor, and the rotor thereof may be disposed at the center of the wavelength conversion wheel 310 to drive the wavelength conversion wheel 310 to rotate. When the wavelength conversion wheel 310 rotates in a same wavelength conversion mode, different parts of one of the first annular areas 311 (for example, the first annular area 311a) cut into the transmission path of the original light beam 212 by turns. A light spot S1 formed by the original light beam 212 on the wavelength conversion wheel 310 is illustrated in FIG. 2A. Namely, FIG. 2A illustrates the state when the first annular area 311a cuts into the transmission path of the original light beam 212.

In the embodiment, at least part of the first annular areas 311 includes at least one light passing area 314. For example, as shown in FIG. 2A, the first annular area 311a includes a light passing area 314a, the first annular area 311b includes a light passing area 314b, and the first annular area 311c includes a light passing area 314c. The light passing area 314 may be an opening on the wavelength conversion wheel 310. Or, in other embodiments, the light passing area 314 may be a transparent area on the wavelength conversion wheel 310. When the wavelength conversion wheel 310 rotates in the same wavelength conversion mode, the wavelength conversion area(s) 312 and the light passing area(s) 314 of one of the first annular areas 311 cut into the transmission path of the original light beam 212 by turns. When the light passing area 314 cuts into the transmission path of the original light beam 212, the original light beam 212 passes through the wavelength conversion wheel 310 via the light passing area 314.

For example, when the wavelength conversion wheel 310 rotates in a direction D1 (i.e., the anticlockwise direction in FIG. 2A) and around the rotation center C1, the wavelength conversion area 312a, the wavelength conversion area 312b, and the light passing area 314a sequentially cut into the transmission path of the original light beam 212 (i.e., sequentially cut into the position of the light spot S1 of the wavelength conversion wheel 310 which the original light beam 212 emits on, as shown in FIG. 2A). In other embodiments, the wavelength conversion wheel 310 may also rotate clockwise.

Additionally, when the wavelength conversion wheel 310 switches among different wavelength conversion modes, the different first annular areas 311 correspondingly cut into the transmission path of the original light beam 212 along the radial direction of the wavelength conversion wheel 310 in a relative movement manner. For example, when the wavelength conversion wheel 310 switches from the state that the first annular area 311a cuts into the transmission path of the original light beam 212 into the state that the first annular area 311b cuts into the transmission path of the original light beam 212 in a relative movement manner, the position of the light spot formed by the original light beam 212 on the wavelength conversion wheel 310 changes from the position of the light spot S1 to the position of the light spot S2, for example. Namely, herein the original light beam 212 irradiates the wavelength conversion areas 312d of the first annular area 311b. Next, when the wavelength conversion wheel 310 rotates in the direction D1 around the rotation center C1, the wavelength conversion areas 312d, the wavelength conversion areas 312e, and the light passing area 314b sequentially cut into the transmission path of the original light beam 212. When the wavelength conversion wheel 310 switches from the state that the first annular area 311b cuts into the transmission path of the original light beam 212 into the state that the first annular area 311c cuts into the transmission path of the original light beam 212 in a relative movement manner, the position of the light spot formed by the original light beam 212 on the wavelength conversion wheel 310 changes from the position of the light spot S2 to the position of the light spot S3, for example. Namely, herein the original light beam 212 irradiates the wavelength conversion areas 312f of the first annular area 311c. Thereafter, when the wavelength conversion wheel 310 rotates in the direction D1 around the rotation center C1, the wavelength conversion area 312f, the wavelength conversion area 312g, and the light passing area 314c sequentially cut into the transmission path of the original light beam 212.

In the embodiment, the wavelength conversion wheel module 300 further includes a second actuator 330. The second actuator 330 is connected to the first actuator 320 and drives the rotation center C1 of the wavelength conversion wheel 310 to move along the radial direction of the wavelength conversion wheel 310. For example, the second actuator 330 may move the rotation center C1 by moving the first actuator 320. When the rotation center C1 is moved, the different first annular areas 311 would be able to correspondingly cut into the transmission path of the original light beam 212 in a relative movement manner. In other embodiments, it may also be that the rotation center C1 remains unmoved, and the second actuator 330 moves the light source 210, so that the original light beam 212 is moved with respect to the rotation center C1, and the different first annular areas 311 may correspondingly cut into the transmission path of the original light beam 212 in a relative movement manner. Thus, the relative movement mentioned herein may be achieved by moving the rotation center C1 but not moving the light source 210, by moving the light source 210 but not moving the rotation center C1, or by moving both the rotation center C1 and the light source 210.

The color wheel module 400 may include a color wheel 410. In the embodiment, the color wheel 410 is disposed on the transmission path of the converted light beam 214 and includes a plurality of second annular areas 411, as shown in FIG. 2A. In the embodiment, the second annular areas are second annular areas 411a, 411b, and 411c, for example. Each second annular area 411 includes a plurality of light filtering areas 412 of different colors, and the second annular areas 411 are arranged along the radial direction of the color wheel 410. For example, the second annular area 411a includes at least one light filtering area 412a and at least one light filtering area 412b, the second annular area 411b includes at least one light filtering area 412c, at least one light filtering area 412d, and at least one light filtering area 412e, and the second annular area 411c includes at least one light filtering area 412f and at least one light filtering area 412g. To be specific, the light filtering areas 412a and 412d may be yellow light filtering areas, the light filtering areas 412b, 412e, and 412g may be green light filtering areas, and the light filtering areas 412c and 412f may be red light filtering areas.

The different second annular areas 411 have different optical parameters, and the optical parameters of the second annular areas 411 are related to the light filtering areas 412. When the color wheel 410 rotates around a rotation center C2 in a same light filtering mode, the light filtering areas 412 of one of the second annular areas 411 cut into the transmission path of the converted light beam 214 by turns. When the color wheel 410 switches among different light filtering modes, the different second annular areas 411 correspondingly cut into the transmission path of the converted light beam 214 along the radial direction of the color wheel 410 in a relative movement manner.

In the embodiment, the color wheel module 400 further includes a third actuator 420. The third actuator 420 is connected to the color wheel 410 and drives the color wheel 410 to rotate around the rotation center C2. The third actuator 420 may be a motor, and the rotor thereof may be disposed at the center of the color wheel 410 to drive the color wheel 410 to rotate. Additionally, in the embodiment, the color wheel module 400 further includes a fourth actuator 430. The fourth actuator 430 is connected to the third actuator 420 and drives the rotation center C2 of the color wheel 410 to move along the radial direction of the color wheel 410.

In the embodiment, the illumination system 200 further includes a light combination unit 230. The light combination unit 230 combines the converted light beam 214 with the original light beam 212 passing through the light passing area 314 into an illuminating light beam 216. The color wheel 410 is disposed on the transmission path of the illuminating light beam 216. The light combination unit 230 may be a dichroic mirror. However, in other embodiments, the light combination unit 230 may also be dichroic prism. The light combination unit 230 is capable of allowing the original light beam 212 to pass through and reflecting the converted light beam 214. For example, the light combination unit 230 allows a blue original light beam 212 to pass through and reflects a red converted light beam 214, a yellow converted light beam 214, and a green converted light beam 214. However, in other embodiment, the light combination unit 230 may also reflect the original light beam 212 while allow the converted light beam 214 to pass through.

In the embodiment, the illumination system 200 further includes lenses 271, 272, 273, 274, 275, 276, 277, and 278 and reflectors 262, 264, and 266. The original light beam 212 emitted by the light source 210 is transmitted to the wavelength conversion wheel 310 sequentially through the light combination unit 230, the lens 271, and the lens 272. The converted light beam 214 from the wavelength conversion wheel 310 is transmitted to the light combination unit 230 sequentially through the lens 272 and the lens 271. The original light beam 212 passing through the wavelength conversion wheel 310 via the light passing area 314 sequentially passes through the lenses 273 and 274, is reflected by the reflector 262, passes through the lens 275, is reflected by the reflector 264, passes through the lens 276, is reflected by the reflector 266, passes through the lens 277, and reaches back to the light combination unit 230. The light combination unit 230 combines the original light beam 212 from the lens 277 and the converted light beam 214 from the lens 271 into the illuminating light beam 216, and the illuminating light beam 216 is transmitted to the color wheel 410 via the lens 278.

In the embodiment, at least a part of the second annular areas 411 of the color wheel 410 include at least one light diffusing area 414. For example, in FIG. 2A, the second annular area 411a includes a plurality of light diffusing areas 414a, the second annular area 411b includes a plurality of light diffusing areas 414b, and the second annular area 411c includes a plurality of light diffusing areas 414c. The light filtering areas 412 and the light diffusing areas 414 in the same second annular area 411 cut into the transmission path of the illuminating light beam 216 by turns. When the light passing area 314 cuts into the transmission path of the original light beam 212, the light diffusing areas 414 correspondingly cut into the transmission path of the illuminating light beam 216. For example, the rotating speed of the wavelength conversion wheel 310 is substantially equal to the rotating speed of the color wheel 410. Accordingly, besides the correspondence between the angle position of the light passing area 314 and the angle position of the light diffusing area 414 when the wavelength conversion wheel 310 and the color wheel 410 rotate, the angle positions of the wavelength conversion areas 312 are also respectively corresponding to the angle positions of the light filtering areas 412. In the embodiment, the illumination system 200 further includes a control unit 280. The control unit 280 is electrically connected to the wavelength conversion wheel module 300 and the color wheel module 400. The control unit 280 controls the wavelength conversion wheel 310 and the color wheel 410 to rotate, so as to make the rotations of the wavelength conversion wheel 310 and the color wheel 410 correspond to each other. For example, the control unit 280 is a micro-processor, which may control the rotations of the wavelength conversion wheel 310 and the color wheel 410 by loading program instructions. Additionally, in the embodiment, because the original light beam 212 passing through the light passing area 314 is still coherent, speckles produced by the original light beam 212 may be effectively reduced through the light diffusing areas 414 of the color wheel 410 diffusing the original light beam 212.

In the embodiment, the optical parameters of the second annular areas 411 include at least one of the opening angles of the light filtering areas 412 with respect to the rotation center C2 of the color wheel 410, the light filtering materials of the light filtering areas 412, the thicknesses of the light filtering materials of the light filtering areas 412, the colors of the light filtering areas 412, the chromas of the light filtering areas 412, the arrangement order of the light filtering areas 412 and the light diffusing areas 414 in the same second annular area 411, the opening angles of the light diffusing areas 414 with respect to the rotation center C2 of the color wheel 410, and the hazes of the light diffusing areas 414. In the embodiment, the illumination system 200 further includes a light integration rod 250, wherein the illuminating light beam 216 is transmitted to the light integration rod 250 after passing through the color wheel 410. The orthogonal projections P1, P2, and P3 of the light entrance of the light integration rod 250 on the color wheel 410 are illustrated in FIG. 2A. The position of the orthogonal projection is approximately consistent with the light spot on the color wheel 410 formed by the illuminating light beam 216 passing through the color wheel 410 and entering the light integration rod 250. Thus, when the color wheel 410 is in a mode which allows the second annular area 411a to cut into the transmission path of the illuminating light beam 216 along the radial direction of the color wheel 410 in a relative movement manner, the position of the orthogonal projection of the light entrance of the light integration rod 250 on the color wheel 410 is the position of the orthogonal projection P1. Similarly, when the color wheel 410 is in a mode which allows the second annular area 411b to cut into the transmission path of the illuminating light beam 216 in a relative movement manner, the position of the orthogonal projection of the light entrance of the light integration rod 250 on the color wheel 410 is the position of the orthogonal projection P2. When the color wheel 410 is in a mode which allows the second annular area 411c to cut into the transmission path of the illuminating light beam 216 in a relative movement manner, the position of the orthogonal projection of the light entrance of the light integration rod 250 on the color wheel 410 is the position of the orthogonal projection P3.

In the embodiment, after being uniformed by the light integration rod 250, the illuminating light beam 216 is transmitted to the light valve 110. The light valve 110 converts the illuminating light beam 216 into an image light beam 112. After that, the image light beam 112 is transmitted to the projection lens 120. The projection lens 120 projects the image light beam 112 onto a screen (not shown) to produce an image. The light valve 110 may be a digital micro-mirror device (DMD), a liquid-crystal-on-silicon (LCOS) panel, or any other suitable spatial light modulator. Additionally, in other embodiments, the light integration rod 250 may be replaced by a lens array to achieve the light uniformization effect.

In the embodiment, the light filtering areas 412a and 412d are yellow light filtering areas, the light filtering areas 412b, 412e, and 412g are green light filtering areas, and the light filtering areas 412c and 412f are red light filtering areas. In addition, in the embodiment, the fluorescence (i.e., the converted light beam 214) emitted by the wavelength conversion areas 312 has a wider spectrum, while the light transmittance spectrum of the light filtering areas 412 is relatively narrower. Thus, the light filtering areas 412 may further purify the color of the fluorescence emitted by the wavelength conversion areas 312 to improve the color saturation of the image projected on the screen.

In the embodiment, the wavelength conversion mode of the wavelength conversion wheel 310 and the light filtering mode of the color wheel 410 may be paired to allow the illumination system 200 to produce different illumination modes. For example, the wavelength conversion mode in which the original light beam 212 irradiates the first annular area 311a may be paired with the light filtering mode in which the illuminating light beam 216 irradiates the second annular area 411a, 411b, or 411c. Similarly, the same goes for the wavelength conversion modes in which the original light beam 212 irradiates the first annular areas 311b and 311c. Thus, the number of illumination effects produced by the illumination system 200 may be calculated by multiplying the number of wavelength conversion modes by the number of light filtering modes. For example, when a user would like to read static report data and accordingly requires a relatively high brightness, the wavelength conversion wheel 310 switches to a wavelength conversion mode in which the original light beam 212 irradiates the first annular area 311*a*, and the color wheel 410 switches to a light filtering mode in which the illuminating light beam 216 irradiates the second annular area 311*b*. In this case, the yellow converted light beam 214 converted by the wavelength conversion area 312*a* is sequentially filtered by the light filtering area 412*c* into a red light beam and by the light filtering area 412*d* into a yellow light beam. Besides, the green converted light beam 214 converted by the wavelength conversion area 312*b* is filtered by the light filtering area 412*e* into a purer green light beam, and the original light beam 212 passing through the light passing area 314 continues to pass through the light diffusing areas 414. Because the wavelength conversion efficiency of yellow phosphor is higher, a brighter image may be accomplished. On the other hand, if the user would like to watch a movie and accordingly desires a better color performance, the wavelength conversion wheel 310 may switch to a wavelength conversion mode in which the original light beam 212 irradiates the first annular area 311*c*, and the color wheel 410 may switch to a light filtering mode in which the illuminating light beam 216 irradiates the second annular area 411*c*. In this case, the red converted light beam 214 converted by the wavelength conversion area 312*f* is further filtered by the light filtering area 412*f* into a purer red light beam, the green converted light beam 214 converted by the wavelength conversion area 312*g* is further filtered by the light filtering area 412*g* into a purer green light beam, and the blue original light beam 212 passing through the light passing area 314*c* continues to pass through the light diffusing area 414*c*.

Thereby, the illumination system 200 in the embodiment may switch different illumination modes by adopting a wavelength conversion wheel 310 associated with a color wheel 410 but not by changing filters (for forming the light filtering areas) or wavelength converters (for forming the wavelength conversion areas) in a disassembling and assembling manner. In convention, when filters and wavelength converters are disassembled and assembled, the user needs to store the filters and wavelength converters and assembly error may be produced, or the filters and wavelength converters may even be contaminated or damaged during the assembly and disassembly process. However, these problems are avoided by the illumination system 200 in the embodiment. The illumination system 200 of the embodiment may switch among different illumination modes by moving the relative position of the wavelength conversion wheel 310 and the original light beam 212 and moving the relative position of the color wheel 410 and the illuminating light beam 216, so that different display modes of the projection device 100 may be respectively optimized. Additionally, to respectively optimize different display modes of the projection device 100, the method provided by the illumination system 200 of the embodiment may effectively decrease the control complexity of synchronous circuit signals and the materials of the wavelength conversion wheel and the color wheel. Moreover, because a wavelength conversion wheel 310 is adopted along with a color wheel 410, the sizes of the illumination system 200 and the projection device 100 may be reduced. Furthermore, because the wavelength conversion wheel 310 and the color wheel 410 respectively have a plurality of annular areas, the surface areas of the wavelength conversion wheel 310 and the color wheel 410 may be effectively utilized.

Figure 3:
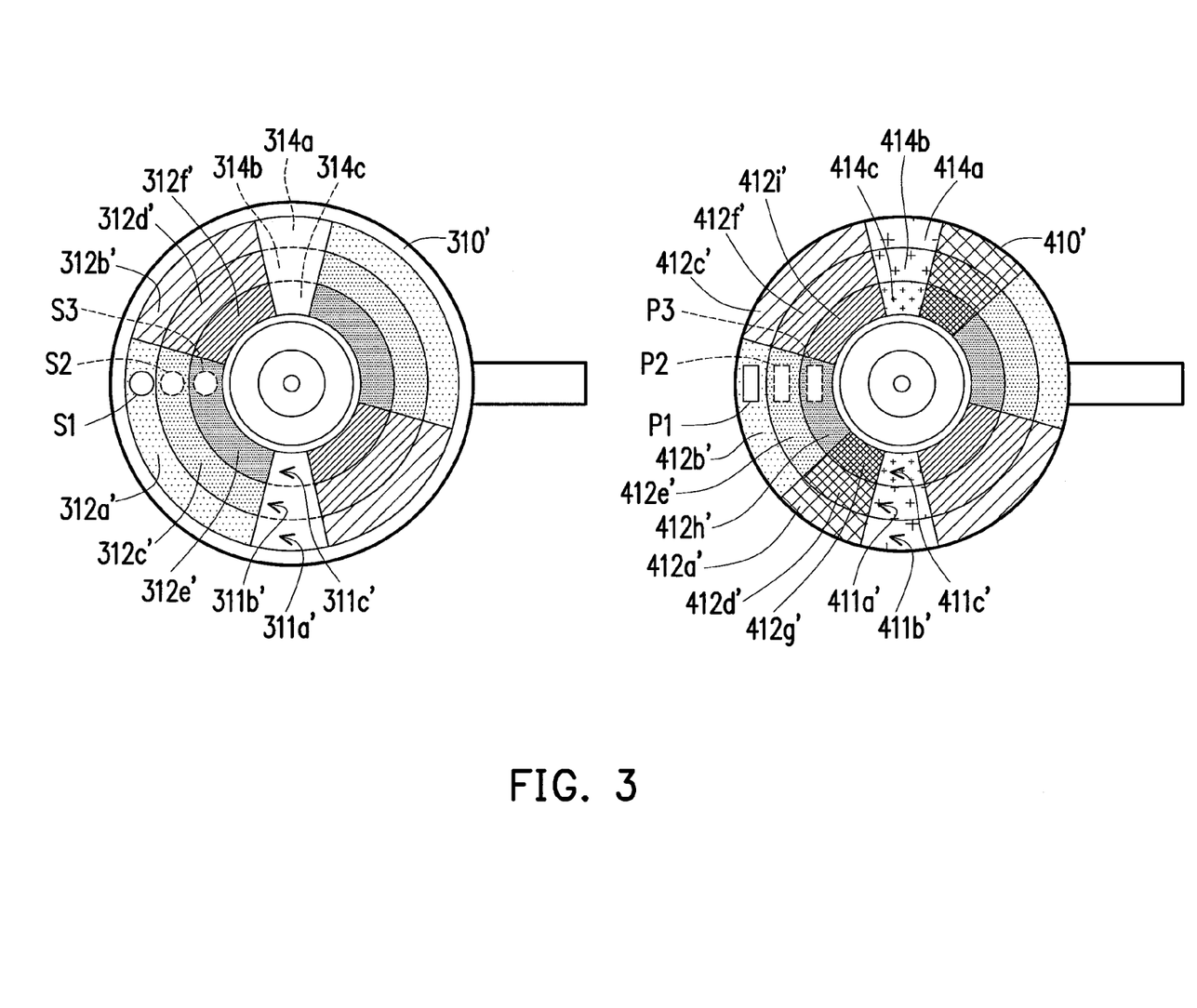
FIG. 3 is a front view of a wavelength conversion wheel module facing an original light beam and a front view of a color wheel module facing an illuminating light beam in an illumination system according to another embodiment of the invention.

Referring to FIG. 3, the illumination system in the embodiment is similar to the illumination system 200 in FIG. 1, and the differences between the two illumination systems are the wavelength conversion wheels and the color wheels. The wavelength conversion wheel 310' and the color wheel 410' in the embodiment are respectively similar to the wavelength conversion wheel 310 and the color wheel 410 in FIG. 2A, and the major difference between the two embodiments would be explained below. In the wavelength conversion wheel 310' of the embodiment, the first annular area 311*a'* includes wavelength conversion areas 312*a'* and 312*b'* and a light passing area 314*a*, the first annular area 311*b'* includes wavelength conversion areas 312*c'* and 312*d'* and a light passing area 314*b*, and the first annular area 311*c'* includes wavelength conversion areas 312*e'* and 312*f'* and a light passing area 314*c*. The wavelength conversion areas 312*a'*, 312*c'*, and 312*e'* may all be yellow fluorescent areas. However, the thickness of the fluorescent material of the wavelength conversion area 312*a'* is smaller than the thickness of the fluorescent material of the wavelength conversion area 312*c'*, and the thickness of the fluorescent material of the wavelength conversion area 312*c'* is smaller than the thickness of the fluorescent material of the wavelength conversion area 312*e'*. In addition, the wavelength conversion areas 312*b'*, 312*d'*, and 312*f'* may all be green fluorescent areas. However, the thickness of the fluorescent material of the wavelength conversion area 312*b'* is smaller than the thickness of the fluorescent material of the wavelength conversion area 312*d'*, and the thickness of the fluorescent material of the wavelength conversion area 312*d'* is smaller than the thickness of the fluorescent material of the wavelength conversion area 312*f'*.

On the other hand, in the color wheel 410' of the embodiment, the second annular area 411*a'* includes light filtering areas 412*a'*, 412*b'*, and 412*c'*, and a light diffusing area 414*a*, the second annular area 411*b'* includes light filtering areas 412*d'*, 412*e'*, and 412*f'*, and a light diffusing area 414*b*, and the second annular area 411*c'* includes light filtering areas 412*g'*, 412*h'*, and 412*i'*, and a light diffusing area 414*c*. The light filtering areas 412*a'*, 412*d'*, and 412*g'* may all be red light filtering areas. However, the chroma of the light filtering material of the light filtering area 412*a'* is smaller than the chroma of the light filtering material of the light filtering area 412*d'*, and the chroma of the light filtering material of the light filtering area 412*d'* is smaller than the chroma of the light filtering material of the light filtering area 412*g'*. In addition, the light filtering areas 412*b'*, 412*e'*, and 412*h'* may all be yellow light filtering areas. However, the chroma of the light filtering material of the light filtering area 412*b'* is smaller than the chroma of the light filtering material of the light filtering area 412*e'*, and the chroma of the light filtering material of the light filtering area 412*e'* is smaller than the chroma of the light filtering material of the light filtering area 412*h'*. Moreover, the light filtering areas 412*c'*, 412*f'*, and 412*i'* may all be green light filtering areas. However, the chroma of the light filtering material of the light filtering area 412*c'* is smaller than the chroma of the light filtering material of the light filtering area 412*f'*, and the chroma of the light filtering material of the light filtering area 412*f'* is smaller than the chroma of the light filtering material of the light filtering area 412*i'*. Furthermore, the haze of the light diffusing area 414*a* is smaller than the haze of the light diffusing area 414*b*, and the haze of the light diffusing area 414*b* is smaller than the haze of the light diffusing area 414*c*. Thereby, multi-type of illumination modes may be achieved by pairing multi-type of wavelength conversion modes of the wavelength conversion wheel 310' with multi-type of light filtering modes of the color wheel 410'.

Figure 4:
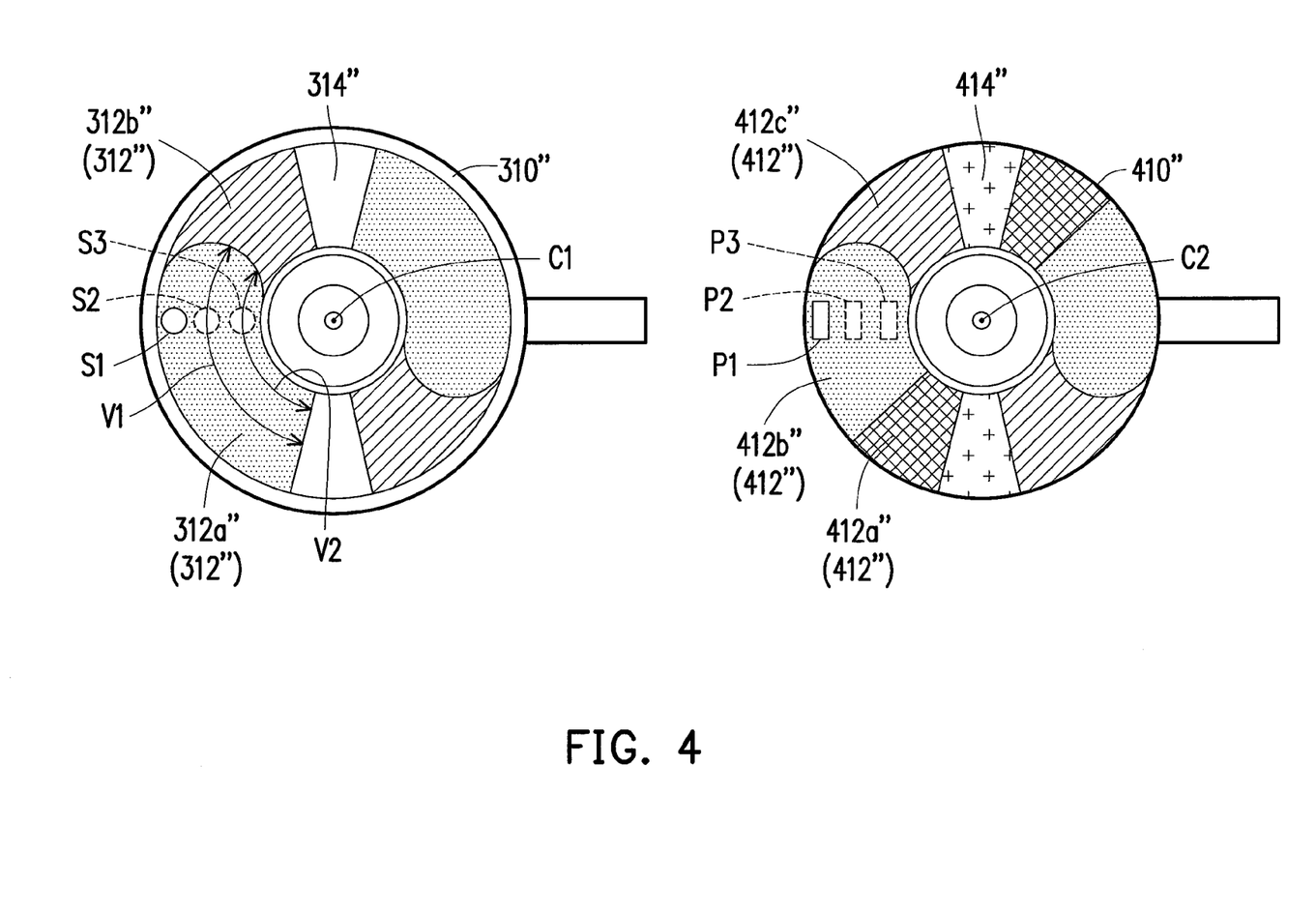
FIG. 4 is a front view of a wavelength conversion wheel module facing an original light beam and a front view of a color wheel module facing an illuminating light beam in an illumination system according to yet another embodiment of the invention.

Referring to FIG. 4, the illumination system in the embodiment is similar to the illumination system 200 in FIG. 1, and the difference between the two illumination systems are the wavelength conversion wheels and the color wheels. The wavelength conversion wheel 310" and the color wheel 410" in the embodiment are respectively similar to the wavelength conversion wheel 310 and the color wheel 410 in FIG. 2A, and the major difference between the two embodiments would be explained below. In the illumination system of the embodiment, the wavelength conversion wheel 310" includes at least one wavelength conversion area 312" (for example, the wavelength conversion areas 312a" and 312b" illustrated in FIG. 4) and at least one light passing area 314". At least one of the optical parameter of the wavelength conversion area 312" and the optical parameter of the light passing area 314" presents a continuous variation along the radial direction of the wavelength conversion wheel 310". In the embodiment, the optical parameter of the wavelength conversion area 312" includes at least one of the opening angle of the arc of the wavelength conversion area 312" at any radial position of the wavelength conversion wheel 310" with respect to the rotation center C1 of the wavelength conversion wheel 310", the thickness of the fluorescent material of the wavelength conversion area 312", the concentration of the fluorescent material of the wavelength conversion area 312", and the color of the wavelength conversion area 312". Besides, the optical parameter of the light passing area 314" includes the opening angle of the arc of the light passing area 314" at any radial position with respect to the rotation center C1. For example, as to the wavelength conversion area 312a", the opening angle of the arc V1 at the radial position of the light spot S2 with respect to the rotation center C1 is greater than the opening angle of the arc V2 at the radial position of the light spot S3 with respect to the rotation center C1. In the embodiment, the opening angles of the arcs of the light passing area 314" at all radial positions with respect to the rotation center C1 are the same. However, in other embodiments, the opening angle of the arc of the light passing area 314" at each radial position with respect to the rotation center C1 may present a continuous variation.

In other words, as to the wavelength conversion wheel 310", the optical parameter presents a continuous variation with the radial position of the wavelength conversion wheel 310"; and as to the wavelength conversion wheel 310 in FIG. 2A, the optical parameter presents a segmented variation with the radial position of the wavelength conversion wheel 310.

When the wavelength conversion wheel 310" rotates around the rotation center C1 in a same wavelength conversion mode, different parts at the same radial position of the wavelength conversion wheel 310" cut into the transmission path of the original light beam 212 by turns. When the wavelength conversion wheel 310" switches among different wavelength conversion modes, parts of the wavelength conversion wheel 310" at different radial positions correspondingly cut into the transmission path of the original light beam 212 along the radial direction of the wavelength conversion wheel 310" in a relative movement manner. In the embodiment, the wavelength conversion area 312a" may be a yellow fluorescent area, and the wavelength conversion area 312b" may be a green fluorescent area.

Additionally, in the embodiment, the color wheel 410" includes a plurality of light filtering areas 412" (for example, the light filtering areas 412a", 412b", and 412c" in FIG. 4). The optical parameters of the light filtering areas 412" present continuous variations along the radial direction of the color wheel 410". When the color wheel 410" rotates around the rotation center C2 in a same light filtering mode, different parts at a same radial position of the color wheel 410" cut into the transmission path of the illuminating light beam 216 by turns When the color wheel 410" switches among different light filtering modes, parts at different radial positions of the color wheel 410" correspondingly cut into the transmission path of the illuminating light beam 216 along the radial direction of the color wheel 410" in a relative movement manner.

In the embodiment, the color wheel 410" further includes at least one light diffusing area 414" (a plurality of light diffusing areas 414" are illustrated in FIG. 4). When the light passing area 314" cuts into the transmission path of the original light beam 212, the light diffusing areas 414" cut into the transmission path of the illuminating light beam 216. In the embodiment, when the wavelength conversion wheel 310" and the color wheel 410" rotate, the angle position of the wavelength conversion area 312a" corresponds to the angle positions of the light filtering areas 412a" and 412b", the angle position of the wavelength conversion area 312b" corresponds to the angle position of the light filtering area 412c", and the angle position of the light passing area 314" corresponds to the angle position of the light diffusing areas 414". In the embodiment, the optical parameters of the light diffusing areas 414"would not change with the change the radial position. However, in other embodiments, the optical parameters of the light diffusing areas 414" may present continuous variations along the radial direction of the color wheel 410".

In the embodiment, the optical parameters of the light filtering areas 412" include at least one of the opening angles of the arcs of the light filtering areas 412" at any radial position of the color wheel 410" with respect to the rotation center C2 of the color wheel 410", the light filtering materials of the light filtering areas 412", the thicknesses of the light filtering materials of the light filtering areas 412", the colors of the light filtering areas 412", and the chromas of the light filtering areas 412", and the optical parameters of the light diffusing areas 414" include at least one of the opening angles of the arcs of the light diffusing areas 414" at any radial position of the color wheel 410" with respect to the rotation center C2 of the color wheel 410" and the hazes of the light diffusing areas 414".

As described above, an embodiment of the invention may achieve at least one of following advantages or effects. In a wavelength conversion wheel module provided by an embodiment of the invention, a plurality of annular areas having different optical parameters would be adopted such that different optical effects may be achieved. In an illumination system provided by an embodiment of the invention, a plurality of annular areas having different optical parameters would be adopted in a wavelength conversion wheel and a color wheel such that different illumination effects may be achieved when the different annular areas of the wavelength conversion wheel and the color wheel respectively cut into the transmission paths of an original light beam and a converted light beam in a relative movement manner. In an illumination system provided by an embodiment of the invention, at least one of the optical parameter of a wavelength conversion area and the optical parameter of a light passing area presents a continuous variation along the radial direction of the wavelength conversion wheel, so that the illumination system may produce different illumination effects and the illumination effects also may change continuously through the wavelength conversion wheel at different radial positions cutting into the transmission path of an original light beam in a relative movement manner.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Furthermore, these claims may refer to use "first", "second", "third", etc. following with noun or element. Such terms should be understood as a nomenclature and should not be construed as giving the limitation on the number of the elements modified by such nomenclature unless specific number has been given.

What is claimed is:

1. A wavelength conversion wheel module, comprising:
a wavelength conversion wheel, comprising a plurality of annular areas, wherein each of the annular areas comprises at least one wavelength conversion area and at least one light passing area, the at least one wavelength conversion area converts an original light beam incident on the wavelength conversion area into at least one converted light beam, a wavelength of the converted light beam is different from a wavelength of the original light beam, and the annular areas are arranged along a radial direction of the wavelength conversion wheel, wherein the annular areas have different optical parameters, and the optical parameters of the annular areas are related to the wavelength conversion area and the light passing area, wherein the at least one wavelength conversion area of each of the annular areas is a plurality of different wavelength conversion areas, and the wavelength conversion areas cut into a transmission path of the original light beam by turns and respectively convert the original light beam into the converted light beams with different wavelengths; and
a first actuator, connected to the wavelength conversion wheel, and driving the wavelength conversion wheel to rotate around a rotation center.

2. The wavelength conversion wheel module according to claim 1, wherein the wavelength conversion areas are a plurality of fluorescent areas with different colors respectively, the original light beam is an excitation light beam, and the fluorescent areas with different colors are respectively excited by the excitation light beam to correspondingly generate the converted light beams with different wavelengths.

3. The wavelength conversion wheel module according to claim 2, wherein the optical parameters of the annular areas comprise at least one of opening angles of the fluorescent areas with respect to the rotation center of the wavelength conversion wheel, fluorescent materials of the fluorescent areas, thicknesses of fluorescent materials of the fluorescent areas, concentrations of fluorescent materials of the fluorescent areas, colors of the fluorescent areas, an arrangement order of the fluorescent areas and the at least one light passing area in the same annular area, and an opening angle of the at least one light passing area with respect to the rotation center of the wavelength conversion wheel.

4. The wavelength conversion wheel module according to claim 1, further comprising a second actuator connected to the first actuator, wherein the second actuator drives the rotation center of the wavelength conversion wheel to move along the radial direction of the wavelength conversion wheel.

5. An illumination system, comprising:
a light source, emitting an original light beam;
a wavelength conversion wheel, disposed on a transmission path of the original light beam, and comprising a plurality of first annular areas, wherein each of the first annular areas comprises at least one wavelength conversion area, the at least one wavelength conversion area converts the original light beam incident on the wavelength conversion area into at least one converted light beam, a wavelength of the converted light beam is different from a wavelength of the original light beam, the first annular areas are arranged along a radial direction of the wavelength conversion wheel, the first annular areas have different optical parameters, and the optical parameters of the first annular areas are related to the wavelength conversion area, wherein different parts of one of the first annular areas cut into the transmission path of the original light beam by turns when the wavelength conversion wheel rotates around a rotation center in a same wavelength conversion mode, and the different first annular areas correspondingly cut into the transmission path of the original light beam along the radial direction of the wavelength conversion wheel in a relative movement maimer when the wavelength conversion wheel switches among different wavelength conversion modes; and
a color wheel, disposed on a transmission path of the converted light beam, and comprising a plurality of second annular areas, wherein each of the second annular areas comprises a plurality of light filtering areas with different colors, the second annular areas are arranged along a radial direction of the color wheel, the second annular areas have different optical parameters, and the optical parameters of the second annular areas are related to the light filtering areas, wherein the light filtering areas of one of the second annular areas cut into the transmission path of the converted light beam by turns when the color wheel rotates around a rotation center in a same light filtering mode, and the different second annular areas correspondingly cut into the transmission path of the converted light beam along the radial direction of the color wheel in the relative movement manner when the color wheel switches among different light filtering modes.

6. The illumination system according to claim 5, wherein the at least one wavelength conversion area of each of the first annular areas is a plurality of different wavelength conversion areas, and the wavelength conversion areas respectively convert the original light beam into the converted light beams with different wavelengths and cut into the transmission path of the original light beam by turns.

7. The illumination system according to claim 6, wherein the wavelength conversion areas are a plurality of fluorescent areas with different colors respectively, the original light beam is an excitation light beam, and the fluorescent areas with different colors are respectively excited by the excitation light beam to correspondingly generate the converted light beams with different wavelengths.

8. The illumination system according to claim 7, wherein the optical parameters of the first annular areas comprise at least one of opening angles of the fluorescent areas with respect to the rotation center of the wavelength conversion wheel, fluorescent materials of the fluorescent areas, thicknesses of fluorescent materials of the fluorescent areas, concentrations of fluorescent materials of the fluorescent areas, colors of the fluorescent areas, and an arrangement order of the fluorescent areas in the same first annular area.

9. The illumination system according to claim 5, wherein each of at least a part of the first annular areas comprises at least one light passing area, the wavelength conversion area and the light passing area cut into the transmission path of the original light beam by turns, the original light beam passes through the wavelength conversion wheel via the light passing area when the light passing area cuts into the transmission path of the original light beam, the illumination system further comprises a light combination unit, the light combination unit combines the converted light beam with the original light beam passing through the light passing area into an illuminating light beam, and the color wheel is disposed on a transmission path of the illuminating light beam.

10. The illumination system according to claim 9, wherein each of at least a part of the second annular areas comprises at least one light diffusing area, the light filtering areas and the light diffusing area in the same second annular area cut into the transmission path of the illuminating light beam by turns, and the light diffusing area cuts into the transmission path of the illuminating light beam when the light passing area cuts into the transmission path of the original light beam.

11. The illumination system according to claim 10, wherein the optical parameters of the first annular areas comprise at least one of an opening angle of the fluorescent area with respect to the rotation center of the wavelength conversion wheel, a fluorescent material of the fluorescent area, a thickness of a fluorescent material of the fluorescent area, concentration of a fluorescent material of the fluorescent area, a color of the fluorescent area, an arrangement order of the at least one fluorescent area and the at least one light passing area in the same first annular area, and an opening angle of the at least one light passing area with respect to the rotation center of the wavelength conversion wheel, and the optical parameters of the second annular areas comprise at least one of opening angles of the light filtering areas with respect to the rotation center of the color wheel, light filtering materials of the light filtering areas, thicknesses of light filtering materials of the light filtering areas, colors of the light filtering areas, chromas of the light filtering areas, an arrangement order of the light filtering areas and the at least one light diffusing area in the same second annular area, an opening angle of the at least one light diffusing area with respect to the rotation center of the color wheel, and a haze of the at least one light diffusing area.

12. The illumination system according to claim 10, further comprising an light integration rod, wherein the illuminating light beam is transmitted into the light integration rod after passing through the color wheel.

13. The illumination system according to claim 10, wherein the light source is a coherent light source, and the original light beam is a coherent light beam.

14. An illumination system, comprising:
a light source, emitting an original light beam; and
a wavelength conversion wheel, disposed on a transmission path of the original light beam, and comprising at least one wavelength conversion area and at least one light passing area, wherein at least one of an optical parameter of the wavelength conversion area and an optical parameter of the light passing area varies continuously along a radial direction of the wavelength conversion wheel, the wavelength conversion area converts the original light beam incident on the wavelength conversion area into a converted light beam, a wavelength of the converted light beam is different from a wavelength of the original light beam, and the light passing area allows the original light beam to pass through the wavelength conversion wheel, wherein different parts of the wavelength conversion wheel at a same radial position cut into the transmission path of the original light beam by turns when the wavelength conversion wheel rotates around a rotation center in a same wavelength conversion mode, and parts of the wavelength conversion wheel at different radial positions correspondingly cut into the transmission path of the original light beam along the radial direction of the wavelength conversion wheel in a relative movement manner when the wavelength conversion wheel switches among different wavelength conversion modes.

15. The illumination system according to claim 14, wherein the wavelength conversion area is a fluorescent area, the optical parameter of the wavelength conversion area comprises at least one of an opening angle of an arc of the fluorescent area at any radial position of the wavelength conversion wheel with respect to the rotation center of the wavelength conversion wheel, a thickness of a fluorescent material of the fluorescent area, concentration of a fluorescent material of the fluorescent area, and a color of the fluorescent area, and the optical parameter of the light passing area comprises an opening angle of an arc of the light passing area at any radial position with respect to the rotation center of the wavelength conversion wheel.

16. The illumination system according to claim 14, further comprising:
a light combination unit, combining the converted light beam with the original light beam passing through the light passing area into an illuminating light beam; and
a color wheel, disposed on a transmission path of the illuminating light beam, and comprising a plurality of light filtering areas, wherein optical parameters of the light filtering areas vary continuously along a radial direction of the color wheel, different parts of the color wheel at a same radial position cut into the transmission path of the illuminating light beam by turns when the color wheel rotates around a rotation center in a same light filtering mode, and parts of the color wheel at different radial positions correspondingly cut into the transmission path of the illuminating light beam along the radial direction of the color wheel in the relative movement manner when the color wheel switches among different light filtering modes.

17. The illumination system according to claim 16, wherein the color wheel further comprises at least one light diffusing area, an optical parameter of the light diffusing area varies continuously along the radial direction of the color wheel, and the light diffusing area cuts into the transmission path of the illuminating light beam when the light passing area cuts into the transmission path of the original light beam.

18. The illumination system according to claim 17, wherein the optical parameters of the light filtering areas comprise at least one of opening angles of arcs of the light filtering areas at any radial position of the color wheel with respect to the rotation center of the color wheel, light filtering materials of the light filtering areas, thicknesses of the light filtering materials of the light filtering areas, colors of the light filtering areas, and chromas of the light filtering areas, and the optical parameter of the light diffusing area comprises at least one of an opening angle of an arc of the light diffusing area at any radial position of the color wheel with respect to the rotation center of the color wheel and a haze of the light diffusing area.

19. The illumination system according to claim 17, further comprising a light integration rod, wherein the illuminating light beam is transmitted into the light integration rod after passing through the color wheel.

* * * * *